April 3, 1928. 1,664,436
B. S. TONNESEN
HOLDER FOR LONG STEM FLOWERS
Filed June 16, 1924
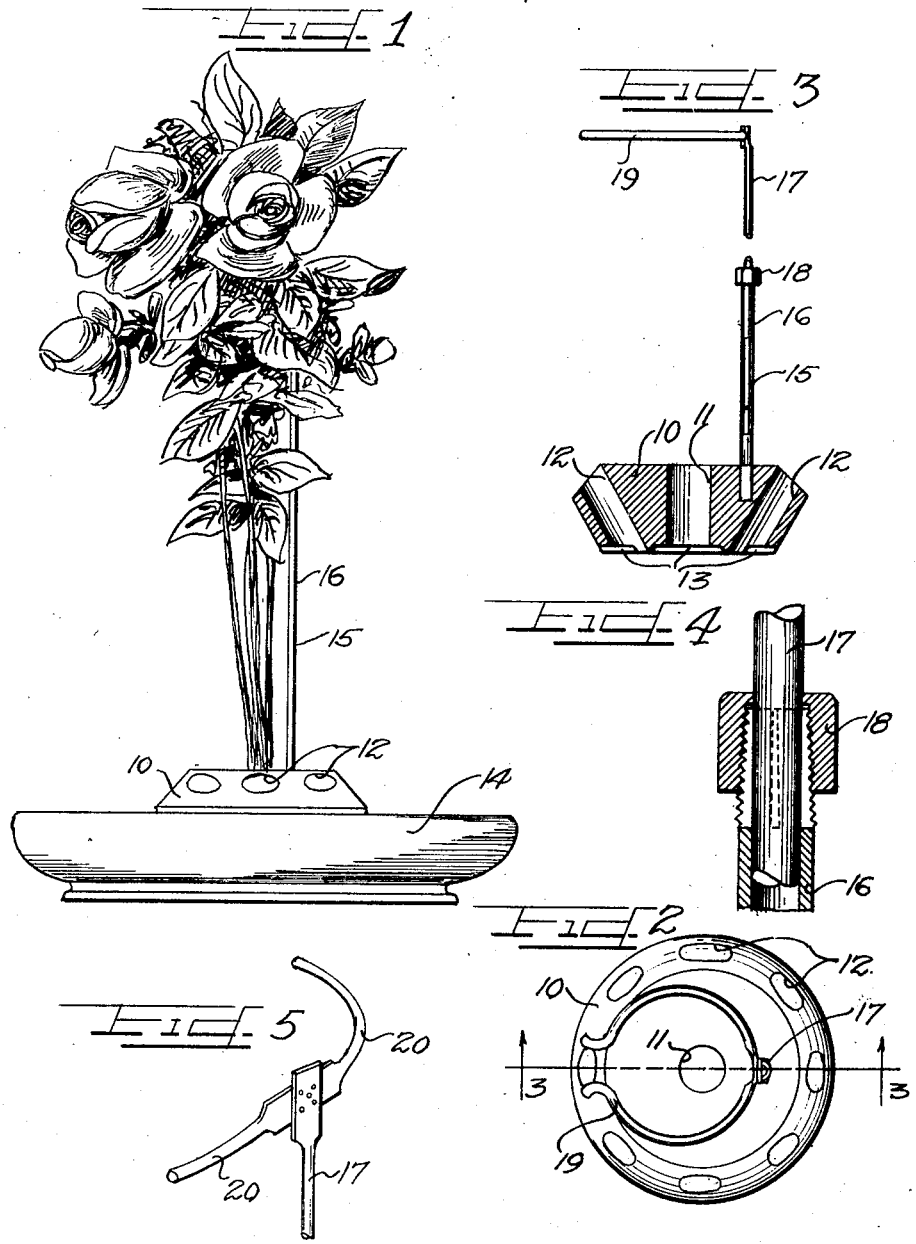
Inventor
Beatrice S Tonnesen.

Patented Apr. 3, 1928.

1,664,436

UNITED STATES PATENT OFFICE.

BEATRICE S. TONNESEN, OF CHICAGO, ILLINOIS.

HOLDER FOR LONG-STEM FLOWERS.

Application filed June 16, 1924. Serial No. 720,182.

This invention relates to flower holders. It is customary in connection with rose bowls and the like to place in the bowl a perforated block into which the stems of the flowers may be inserted for support. This arrangement while suited for short stemmed flowers is not adapted for long stemmed ones.

It is an object, therefore, of the present invention to provide a holder or support for long stemmed flowers.

Other and further important objects of this invention will be apparent from the disclosures in the accompanying drawings and the following specification.

The invention (in a preferred form) is illustrated on the drawings and hereinafter more fully described.

On the drawings:—

Figure 1 is a side elevation of a bowl with a flower holder constructed in accordance with the present invention.

Figure 2 is a plan view of the holder.

Figure 3 is a section on the line 3—3 of Figure 2.

Figure 4 is a section through the telescopic joint of the holder.

Figure 5 is a view of the upper part of the holder showing a modified form of stem encircling arms.

As shown on the drawings:—

The holder comprises a base 10, preferably of iron or other heavy material, provided with a central aperture 11 and a series of upwardly and outwardly extending inclined apertures or passages 12 spaced therearound. The lower part of the base has recesses 13 formed therein to allow the water in the bowl 14 in which the holder is placed to pass freely in and out of these apertures.

Extending vertically upwards from an off center point of the base is an upright 15, preferably telescopic so that its height may be adjusted to suit the length of stem of the flowers to be supported. As shown, the lower half 16 of the upright is square at its lower end for frictional, rigid and non-rotatable engagement with a similarly shaped aperture in the base and tubular at its upper end into the open end of which extends a rod 17 forming the upper half of the upright. The top of the tube 16 is conical in form, threaded and slotted so that it may be compressed against the rod 17 to hold the latter in adjusted position by tightening the union 18.

Secured to the upper end of the rod 17 are suitable stem holding means. Ordinarily a rigid closed ring is not desirable since in inserting the stems therethrough the leaves are apt to be stripped from the latter. A more suitable arrangement is a ring, such as that shown at 19 in Figure 2, having an opening at one side through which the stems may be inserted. Conveniently the ring may be of resilient material bendable in any direction so that the ends are normally in contact but may be separated, as shown in Figure 2, when it is desired to insert the flower stems.

Another method is that illustrated in Figure 5 according to which arms 20 of suitable pliable material, such as lead, are provided which may be bent around the stems to hold them in place.

I am aware that many changes may be made, and numerous details of construction may be varied through a wide range without departing from the principles of this invention, and I therefore do not purpose limiting the patent granted hereon, otherwise than necessitated by the prior art.

I claim as my invention:—

1. The combination of a heavy base having a central vertical aperture and a series of upwardly and outwardly inclined apertures spaced around the central aperture, with an upright frictionally and rigidly secured at its lower end to the base at a point offset with respect to the central aperture of said base, and a pair of resilient arms attached to the upper end of said upright.

2. In combination, a heavy base having a vertical and a plurality of oblique passages therethrough and provided with recesses in the bottom thereof in communication with said apertures, a telescopic upright frictionally secured in said base, and a pair of resilient arms bendable in any direction affixed to said upright adjacent its top and extending over said base.

3. In a device of the class described, a heavy base having passages therethrough and a square recess therein, a telescopic upright set in said recess, and resilient arms affixed to said upright and extending over said base.

4. A holder for flowers comprising an apertured base having a recess therein, a member set in said recess, said member being slotted, tapered and threaded adjacent its upper end, a second member telescopically associated with said first mentioned member, threaded means for securely holding said second member in a desired position, and resilient arms on said second member.

5. In a device of the class described, an apertured base having a recess therein of angular cross-section, a telescopic upright having its lower end shaped complementary to said recess for rigid non-rotatable engagement therein, and a plurality of resilient arms on the upper end of said upright.

In testimony whereof I have hereunto subscribed my name.

BEATRICE S. TONNESEN.